United States Patent
Lambiaso

(10) Patent No.: US 6,860,554 B2
(45) Date of Patent: Mar. 1, 2005

(54) INCORPORATION OF INTERNET CONNEXION CONNECTIVITY TO A PREEXISTING COMMUNICATION INFRASTRUCTURE

(75) Inventor: Guy Lambiaso, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 145 days.

(21) Appl. No.: 10/027,948

(22) Filed: Dec. 19, 2001

(65) Prior Publication Data

US 2003/0111880 A1 Jun. 19, 2003

(51) Int. Cl.⁷ .............................................. A47C 31/00
(52) U.S. Cl. ............................. 297/217.3; 297/188.04; 379/446
(58) Field of Search ........................... 297/217.1, 217.3, 297/188.04, 188.01, 188.2; 379/428.04, 446, 438

(56) References Cited

U.S. PATENT DOCUMENTS

| | | | | |
|---|---|---|---|---|
| 5,155,766 A | * | 10/1992 | Skowronski | 379/438 |
| 5,410,597 A | * | 4/1995 | Kepley, III et al. | 379/449 |
| 5,558,339 A | * | 9/1996 | Perlman | 463/42 |
| 5,644,624 A | * | 7/1997 | Caldwell | 379/69 |
| 5,652,792 A | * | 7/1997 | Gallagher et al. | 379/446 |
| 5,708,706 A | * | 1/1998 | Hughes et al. | 379/446 |
| 5,739,746 A | * | 4/1998 | Shaffer et al. | 340/425.5 |
| 5,865,503 A | * | 2/1999 | Shields, Jr. | 297/188.14 |
| 5,883,944 A | * | 3/1999 | Burke et al. | 379/159 |
| 6,059,583 A | * | 5/2000 | Croft et al. | 439/131 |
| 6,134,017 A | * | 10/2000 | Schlank et al. | 358/1.15 |

FOREIGN PATENT DOCUMENTS

| | | | |
|---|---|---|---|
| GB | 2253782 | * | 9/1992 |
| WO | WO 95/29552 | * | 11/1995 |

* cited by examiner

Primary Examiner—Peter M. Cuomo
Assistant Examiner—Stephen Vu
(74) Attorney, Agent, or Firm—Harness Dickey & Pierce P.L.C.

(57) ABSTRACT

A telephone system apparatus and method adapted for use on an aircraft seatback which provides an electrical connection point (i.e., jack) formed on a housing of the telephone system. The connection point permits coupling of a user's laptop computer to an on-board network, while the housing also provides the electrical connection point for a telephone handset. In one embodiment a pair of additional electrical connection points are provided for allowing more than one individual to couple his/her laptop computer to phone system, and thus gain access to the network. The telephone system eliminates the need to attach independent jacks at various locations on the seats and efficiently uses the housing of the telephone system for this purpose.

5 Claims, 2 Drawing Sheets

INCORPORATION OF INTERNET CONNEXION CONNECTIVITY TO A PREEXISTING COMMUNICATION INFRASTRUCTURE

FIELD OF THE INVENTION

The present invention relates to an apparatus and method for providing an additional communication terminal for a mobile communication device. More specifically, the invention relates to the incorporation of one or more additional data transmission terminals onto a preexisting communication device.

BACKGROUND OF THE INVENTION

Airline provided communication devices, specifically telephones, are well established conveniences offered on a majority of commercial aircraft. The utilization of these communication devices typically involves the passengers purchasing an allotment of time and placing a call from a telephone located in their immediate area. Advantageously, airliners have typically mounted such telephones in the seatback of one seat in each row of the row of seats so that the telephones are accessible to all of the passengers in the row of seats immediately behind the seatback with the telephone. These telephones are connected to a terminal located on a telephone cradle and further to a transmitter device at a remote location of the aircraft. Such a system allows multiple telephone systems to be connected to one or more transmitter devices so that numerous users can communicate with other communications devices outside the aircraft through means such as by satellite communication links.

Recently, technology has provided numerous communication devices, other then telephones, which allows a user to send and receive information, such as e-mail. Typically, this method for data transmission amounts to the utilization of either a local area network (LAN) or the Internet. Such communication devices include desktops, laptops and handheld computers which require a link between the communication device and a transmitter device. With the increased use of laptops and handheld computers and the ability to transport these small computers, terminals are now being installed in numerous places, both private and public, to allow and encourage utilization of e-mail and the Internet.

With this continual adaptation for the computer age, airlines are configuring and modifying aircraft with terminals for these small, portable communication devices. However, the pace of these modifications has been slow due to the high cost of installation and the down time required to make such modifications to an aircraft. The process requires installation of additional terminals, with associated electrical cabling and connection terminals, for the connection of these personal communication devices.

Thus, there is a need for a low cost modification to an existing telephone system used on aircraft to allow mobile transmitting devices to be used. Moreover there is a need for a modification to the existing telephone systems used, on present day aircraft, to allow users the ability to send and retrieve information via their personal communication devices.

SUMMARY OF THE INVENTION

The present invention overcomes the above described drawbacks of prior art systems by providing a telephone system having one or more additional terminals for linking mobile communication devices to a remote communication device. The present invention also provides a method for modifying a preexisting telephone system, located on a seat, to mountably receive one or more additional terminals.

In a first aspect, the present invention provides an integrated telephone system adapted to be housed in a seat of a mobile platform. The integrated telephone system comprises a housing for supporting a first terminal and a second terminal. The first terminal provides an electrical connection point for a telephone handset and the second terminal, accessibly located to a first user, provides an electrical connection point for a computing device of the first user.

In a second aspect, the present invention provides a seat mounted to a vehicle having an integrated telephone system. The telephone system comprises a cradle mounted in a recessed portion of the seat and has a first terminal adapted to couple to a communication device and a second terminal adapted to couple to a computing device. The first and second terminal are located on the cradle of the integrated telephone system.

The present invention also provides a method for adapting an existing seat mounted telephone system with one or more alternate terminals. The method provides modifying a telephone system to receive a first additional terminal having an interface. The first additional terminal is then affixed to the telephone system and connected to a communication cable.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
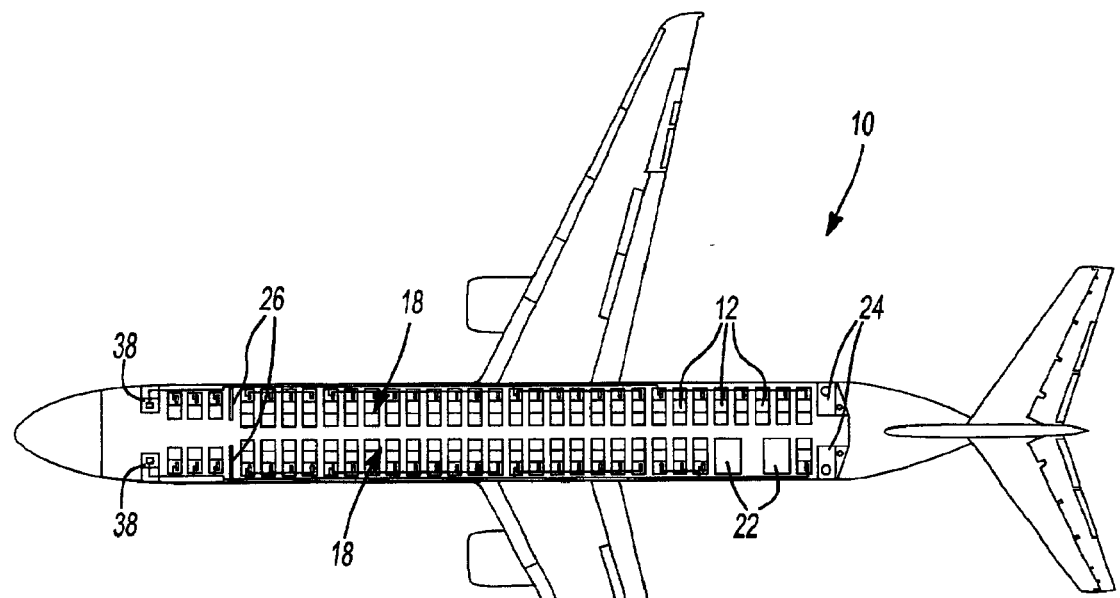
FIG. 1 is a plan view of an interior area of an aircraft in which the phone system of the present invention is employed.

Referring to FIG. 1 of the present invention, an aircraft 10 is shown having a plurality of seats 12 in a predetermined arrangement based on the model type of the aircraft 10. The seats 12 can be any passenger seat, pilot seat or other seat in a commercial or any other type of aircraft. Such seats 12 may be found in first class, business class or tourist class. Likewise, such seats 12 may be used by the pilot, co-pilot or navigator or other flight crew member, as well as by non-crew member passengers. A plurality of different types of designs of such seats 12 exist in the present state of the art, and the specific form of seat shown and described herein is merely exemplary in nature as the shape of the seat, and the arrangement of the seats 12 within an aircraft may vary with the model of the aircraft 10.

Figure 2:
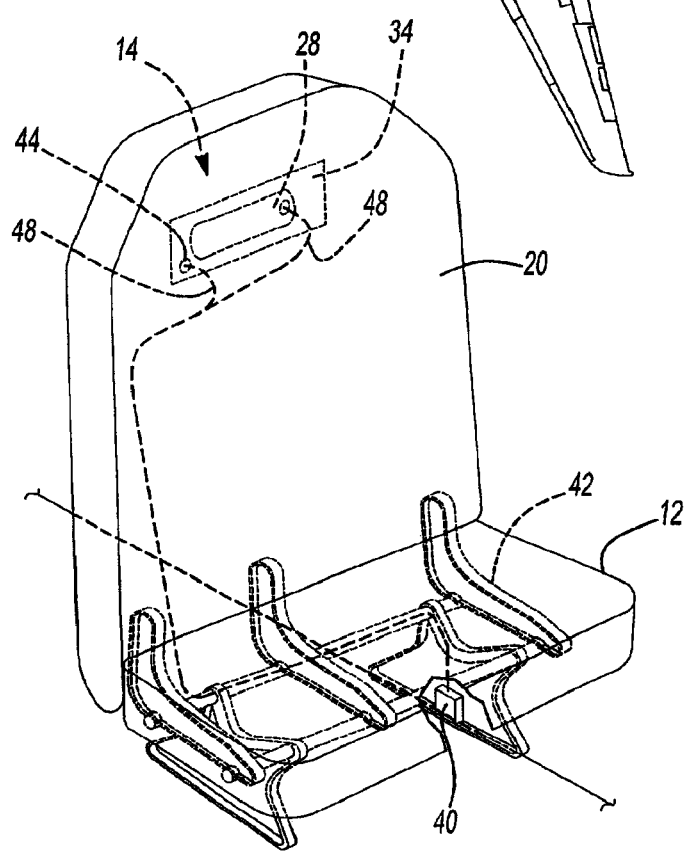
FIG. 2 is a perspective view of an aircraft seat for housing the phone system of the present invention.
Figure 3:
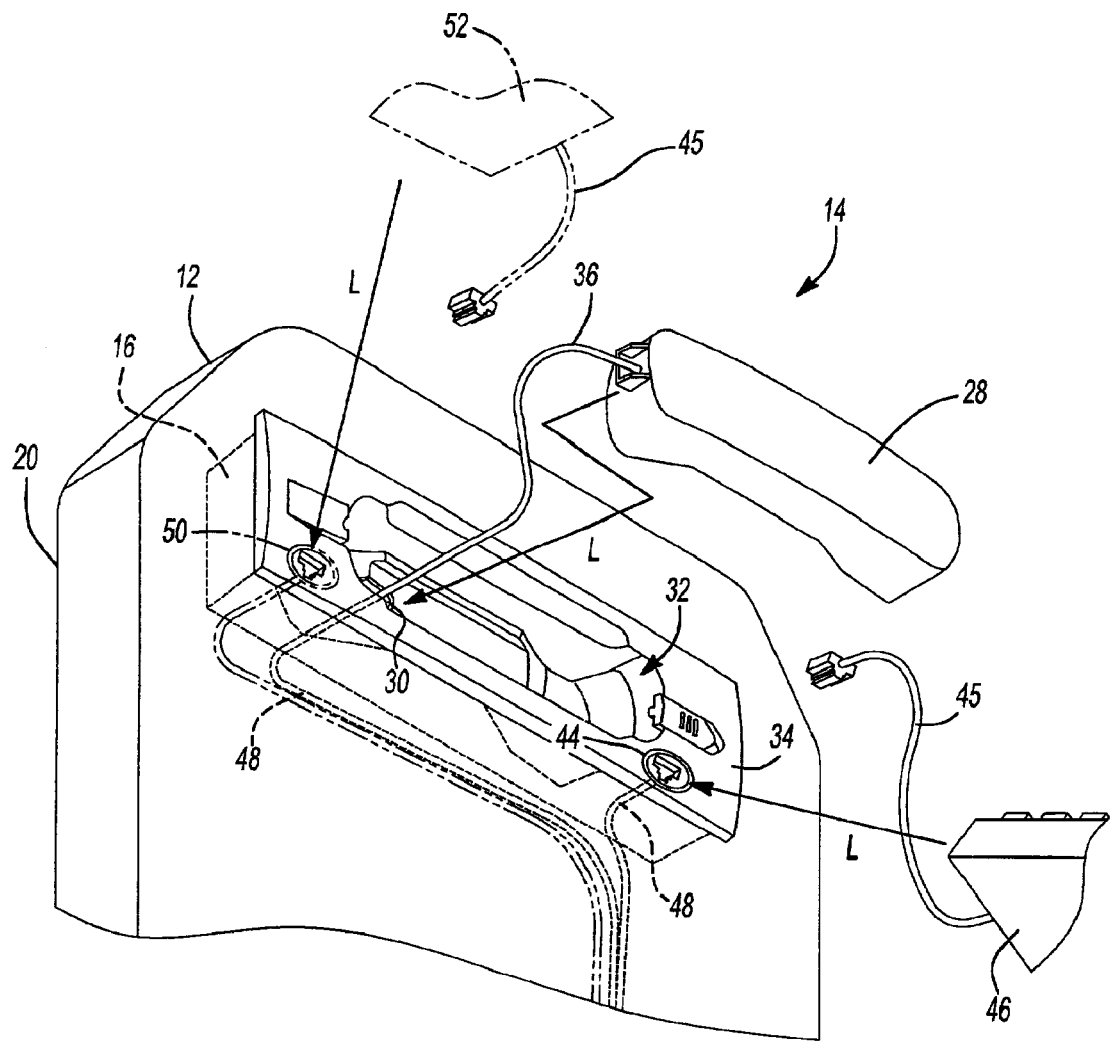
FIG. 3 is a perspective view of a telephone system mounted to a seatback in accordance with the present invention.

FIGS. 2 and 3 illustrates the seat 12 in greater detail. A select number of seats 12 are configured to house a telephone system 14 in accordance with a preferred embodiment of the present invention. The phone system 14 is housed within a recessed portion 16 of the seat 12. These seats 12, having the telephone system 14, are preferably located to allow accessibility of the telephone system 14 to more then one passenger, and more preferably to all the passengers in the row of seats 18 immediately behind the telephone system 14. In the present invention the telephone system 14 is mounted to the seatback 20 of each seat 12, however, it is also conceivable that the telephone system 14 of the present invention may be mounted in other locations throughout the aircraft 10 such as in galleys 22, lavatories 24 or on partitions 26. Some suitable methods of mounting of telephone system 14 to the seatback 20 of aircraft seat 12 and other locations comprise conventional mechanical fasteners, snap fit fasteners or hook and loop type fastener assemblies, as is well known in the art.

Referring to FIG. 3, the telephone system 14 includes a first communication device, a telephone handset 28, which is coupled to a telephone terminal 30. The telephone terminal 30 is typically located in a recessed portion 32 of a telephone cradle 34 and in communication with the telephone handset 28 using a telephone cable 36 or alternatively a wireless link L. Advantageously, the telephone terminal 30 may be configured to releasably store the telephone cable 36 such that the telephone handset 28 can easily extend to all passengers in a section of the seats 18 but can still be retractably stored within the cradle 34.

Referring to FIGS. 1 and 3, the telephone terminal 30 is further connected, directly or indirectly, to a transmitter device 38, typically through a LAN connection (not shown), so that the signal generated by the telephone handset 28 is transmitted to ground or orbiting receivers or transponders. However the telephone handset 28 may also be connected in series with an additional connector, such as a ECU box 40 (FIG. 2) located on seat support frame 42, and then to the transmitter 38.

Referring further to FIG. 3, the telephone system 14 is shown having a first additional terminal 44. Preferably the additional terminal 44 is located on a substantially flat portion of the telephone cradle 34 and substantially adjacent to one of the four corners of the cradle. The first additional terminal 44, in one form, comprises a modular telephone jack. This terminal 44 can be coupled to a communication device such as a laptop computer 46 such that the first additional terminal 44 forms the female end of the connection and the laptop computer has a cable 45 which forms the male end. Alternatively, a wireless link L is also contemplated for the transmission between the laptop computer 46 and the first additional terminal 44. The first additional terminal 44 is preferably configured with an RJ-45 interface which is used with Ethernet connections. However, the first additional terminal 44 is not limited to this type of connection. A USB port, serial port, parallel port, telephone jack or wireless receiver may also be used.

As with the telephone terminal 30, the first additional terminal 44 is also connected to the ECU box 40 and the transmitter device 38 through a LAN connection. However, it is possible to forego the ECU box 40 altogether and connect the first additional terminal 44 directly to the transmitter device 38. The connections used, between the laptop 46 and ECU box 40 and the transmitter device 38 is typically an Ethernet cable 48, however, it is contemplated with the present invention that any form of cable or connector may be utilized to improve the performance of the data transmission. For example, optical fibers can also be used as a conduit for the transmission of signals between the communication device and the transmitter device. Likewise, a wireless transmission system is also contemplated for the transmission of a signal to a transmitter device.

In another aspect of the present invention, the phone system 14 also includes a second additional terminal 50 which is also mounted on the cradle 34. Referring to FIG. 3, as illustrated in phantom, the second additional terminal 50 is also located on a substantially flat portion of the telephone cradle 34 and adjacent to one of its four corners. The second additional terminal 50 is configured to be coupled with a second communication device, such as a laptop computer 52, using the same methods as the first additional terminal 44. The connection from the second additional terminal 50 to the transmitter device 38 is also the same as the first additional terminal 44 and typically uses an Ethernet cable 48. Preferably, the second additional terminal 50 is configured with an RJ-45 interface which is used with Ethernet connections, however, other means are available as previously discussed.

Preferably, the coupling between the terminals 30, 44, 50 and ECU box 40 or transmitter device 38 are bundled or grouped together such that the existing structure of the seatback 20 and the seat support frame 40 remain substantially unchanged. The transmitter device 38, used with the additional terminals 44, 50, uses a LAN type connection and selectively transmits the signals received from the additional terminals 44, 50. Alternatively, the transmitter device 38 also transmits signals to the additional terminals 44, 50 and further to the laptop computers 46, 52 as is well known in the art of Internet utilization with LAN networks.

The above configuration allows a second individual to utilize a second communication device, such as a laptop computer 52, in the same manner as the first additional terminal 44 is used by communication device 46. Likewise, it is conceivable to mount a third, a fourth, or even greater plurality of additional terminals for enabling a greater plurality of communication devices to utilize e-mail and other Internet related programs substantially simultaneously.

In a first method, the process of creating a telephone system 14 consisting of one or more terminals is contemplated. In the method, the first additional terminal 44 is mounted to the telephone cradle 34 of the telephone system 14. Preferably, the first additional terminal 44 is mounted to the substantially flat portion of the telephone cradle 34. More preferably, the first additional terminal 44 is mounted, in part, in a recessed or cut out portion of the telephone cradle 34 which is formed prior or post manufacture of the telephone cradle 34. Referring to FIG. 3, the first additional terminal 44 is located adjacent to one of the corners of the phone cradle 34. This first additional terminal 44 is linked to a transmitter device by a conduit such as the Ethernet cable 48. The first additional terminal 44 is configured to receive an Ethernet jack such as the R-45 jack or there like. Alternatively, the first additional terminal 44 may also be configured to receive a parallel, serial or USB port.

In a second method, a first additional terminal 44 and a second additional terminal 50 are mounted to a portion of the telephone cradle 34 in a manner described above. Referring to FIG. 3, the first and second (shown in phantom) additional terminals 44, 50 are located adjacent to corners of the telephone cradle 34 and are linked to the ECU box 40 and transmitter 38 by a cable such as an Ethernet cable 48. Preferably, the associated Ethernet cables of the first and second additional terminals 44, 50 are bundled together with the telephone cable 36 to the ECU box 40 and a LAN connection of transmitter 38. The second additional terminal 50 is also configured to receive an Ethernet jack such as the R-45 jack, though alternate types can be used (e.g. parallel, serial or USB ports). Additionally, it is foreseeable that more then two additional terminals may be mounted to the cradle 34 of the telephone system 14.

The telephone system 14 of the present invention thus forms a means for providing a point of connection for at least one computing device, as well as the primary function of acting as an on-board telephone. Advantageously, the phone system 14 eliminates the need to dispose additional jacks at various locations around one or more aircraft seats, and instead provides a convenient point of attachment to an existing structure (i.e., the telephone cradle 34) that users can access when connecting their computing devices to an on-board network. The present invention can be employed in any mobile platform such as a train, cruise ship or bus, where it would be desirable to provide users with the ability to couple their personal computing devices to a pre-existing telephone system.

The description of the invention is merely exemplary in nature and, thus, variations that do not depart from the gist of the invention are intended to be within the scope of the invention. Such variations are not to be regarded as a departure from the spirit and scope of the invention.

What is claimed:

1. An integrated telephone system adapted to be housed in a seat of a mobile platform, the system comprising:
   a cradle for housing a telephone handset;
   a first terminal supported on said cradle, said first terminal providing an electrical connection point for said telephone handset of said system and a first communication link to a remote transmitter of the mobile platform;
   a second terminal supported on a substantially flat portion of said cradle substantially adjacent to one of four corners of said cradle, said second terminal providing a wireless connection point for a computing device of said a first user and a second communication link to the remote transmitter, said system adapted to provide the first and second communication links simultaneously; and
   a third terminal supported on said substantially flat portion of said cradle substantially adjacent to another one of said four corners of said cradle, said third terminal providing a wireless connection point for a computing device of a second user and a third communication link to the remote transmitter, said system further adapted to provide said first, second and third communication links simultaneously.

2. The integrated telephone system of claim 1, wherein said second terminal provides a wireless Ethernet connection.

3. The integrated telephone system of claim 1, wherein said third terminal provides a wireless Ethernet connection.

4. A seat mounted to a vehicle, said seat comprising:
   an integrated telephone system comprising:
   a cradle mounted in a recessed portion of the seat;
   a first terminal adapted to have a wireless communication connection to a communication device and to provide a first communication link to a transmitter located remotely from said cradle, said first terminal located on said cradle;
   a second terminal adapted to have a wireless communication connection to a first computing device of a first user and to provide a second communication link to the remote transmitter, said second terminal located on a substantially flat portion of said cradle substantially adjacent to one of four corners of said cradle, said integrated telephone system adapted to provide said first and second communication links simultaneously; and
   a third terminal adapted to have a wireless communication connection to a second computing device of a second user and to provide a third communication link to the remote transmitter, said third terminal located on said substantially flat portion of said cradle substantially adjacent to another one of said four corners, said integrated telephone system further adapted to provide to provide said first, second and third communication links simultaneously.

5. The seat of claim 4, wherein said communication device comprises a telephone handset.

* * * * *